June 17, 1930.  T. M. EYNON  1,765,008
GASOLINE INDICATOR
Filed July 27, 1922
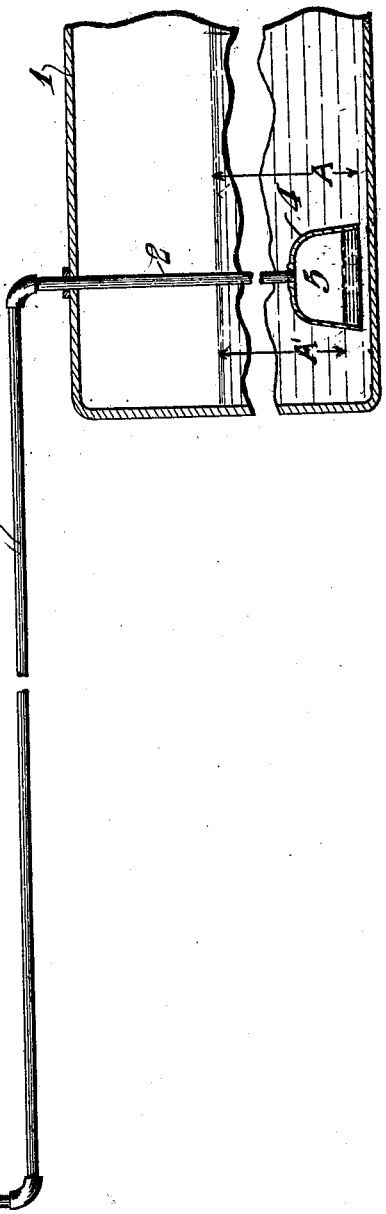
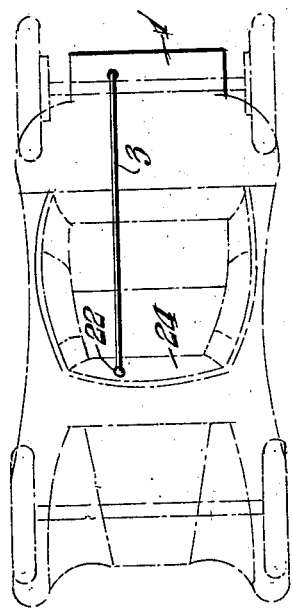
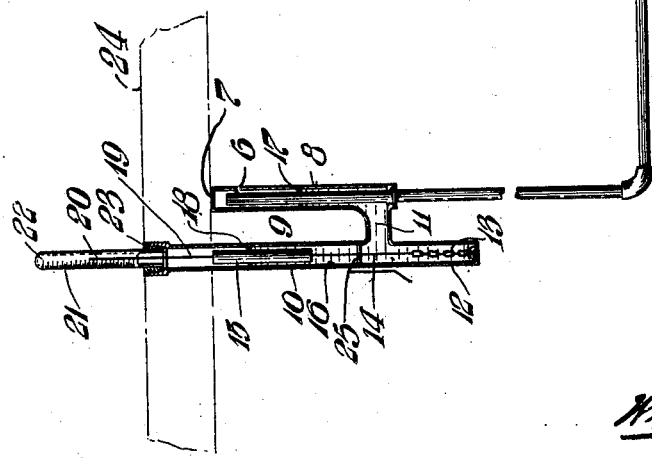
INVENTOR:
THOMAS M. EYNON
BY
ATTORNEYS.

Patented June 17, 1930

1,765,008

UNITED STATES PATENT OFFICE

THOMAS M. EYNON, OF PHILADELPHIA, PENNSYLVANIA

GASOLINE INDICATOR

Application filed July 27, 1922. Serial No. 577,805.

My invention relates to a novel gasoline indicator which can be readily installed upon automobiles or other self propelled vehicles or upon tanks of any standard or conventional type without change therein, whereby the height or level of the gasoline or other liquid will be visually indicated with great accuracy at the desired point through the agency of a fluid medium whereby the use of rods, links and other mechanical connections is entirely dispensed with.

In carrying out my invention, I employ a U-shaped tube adapted in the case of an automobile to be secured upon the instrument board at any desired point, a portion of said U-shaped tube communicating with one terminal of a pipe leading from the gasoline tank, whose other terminal is positioned within said tank and provided with an inverted bell or U-shaped member, whereby a body of air or an air cushion is at all times contained in said bell member, the broad principle of my invention involving the creation of pressure within a bell chamber of a gasoline or other tank, the transferral of said pressure to the upper end of one member of a U-shaped tube and the utilization of the pressure or variations of pressure in the upper end of said U-shaped tube member to cause the level of the liquid in the U-shaped tube members to vary according to the variations of pressure within the bell terminal of the gasoline tank, whereby all variations of level in the gasoline or other tank are accurately and instantly indicated at the desired point through the medium of a float (or the liquid) in the other member of said U-shaped tube.

To the above ends, my invention consists of the novel method hereinabove referred to and of my novel apparatus for carrying out the above steps of my method.

It further consists of other novel features of construction, all as will be hereinafter fully set forth.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation, partly in section, of a gasoline indicator, embodying my invention.

Figure 2 represents in dotted lines a plan view of an automobile or other self-propelled vehicle to which my invention is applicable, the gasoline tank and the connections therefrom to the indicator being shown in full lines.

Similar numerals of reference indicate corresponding parts in the figures.

Referring to the drawings.

In carrying out my invention, I locate in the gasoline tank 1, one end 2 of the pipe 3, said end 2 being connected with an inverted U-shaped or cup shaped vessel or bell 4, which is open at its lower end, whereby an air or pressure chamber 5 is created, when the bell is immersed in the gasoline or other liquid, as will be understood from the right-hand of Figure 1.

The other or upper end of the pipe 3 as indicated at 6 terminates near the closed top 7 of the member 8 of the U-shaped tube 9, the latter comprising said member 8 and the member 10, which members are joined at their lower portion by the neck 11, said member 10 having a downward extension 12 in the bottom of which is contained a chain or counterweight 13, whose upper end is attached to the rod 14, which passes through the guide 25 and has its upper end secured to the vertically movable float 15. The float 15 is immersed in a suitable liquid, as indicated at 16, which is preferably a suitable vegetable oil, which will not freeze or evaporate, and the respective different heights or levels of said liquid 16 in the members 8 and 10 of the U-shaped tube 9 are indicated at 17 and 18 respectively. From the upper end of the float 15 extends the rod 19, whose upper portion 20 serves as an indicating means and is positioned in proximity to the scale or gauge of the indicating device 22, which may be a transparent tube or the like which is held in position by a suitable coupling device, as indicated at 23, said coupling device and the upper end of the member 10 being preferably positioned on or with respect to the instrument board 24 so as to be readily visible as will be understood from the left-hand portion of Figure 1. The chain or counterweight 13 serves to weight the float 15 down to limit the buoyancy of said float, it being understood that this result can be accomplished without the aid of the chain 13 if desired, by using a heavy substance from which to make the float 15 or by increasing the length as well as the weight of the float 15. The chain 13 is used because it can flex and coil up in the bottom of the chamber 12 when the float 15 is in its lowermost position and because it permits of accurate adjustment by increasing or decreasing the number of links in the chain 13. When the float 15 is in its uppermost position the chain 13 is still submerged in the fluid 16 below the member 25 in the chamber 12 so that the counter-weighting or counter-balancing function of the chain 13 and its effect on the buoyancy of the float 15 is constant. The primary function of the chain 13 is to prevent the rise of the float 15 in direct proportion to the rise of the fluid 16 in the chamber 12, thus rendering the device more accurate and compact since it permits the use of smaller graduations 21 on the tube portion 22 to represent relatively large variations in the level of the liquid in the tank 1, and since it permits the use of a shorter graduated tube portion 22 than would be possible if the float 15 were to have a stroke or range of movement directly proportional to the rise and fall of the fluid level in the chamber 12.

It will be seen that the internal area or pressure chamber 5 of the inverted cup member 4 in the gasoline tank is much larger than the area in the U-shaped tube 9, so that if the tank 1 is half filled with gasoline or other fluid, the air entrapped in the chamber 5 of the bell will only permit the liquid to rise within the bell, say, for example, one inch, while the liquid 16 in the U-shaped tube due to the pressure of the air in the connecting tube 3 from the gasoline tank 1 will have risen say four inches.

It will readily be seen from the foregoing that as the water level or the height of the gasoline or other liquid in the tank 1 varies, a corresponding variation of pressure will be created in the pressure chamber 5 within the bell, and that such variations of pressure will be instantly transferred through the tube 3 to the chamber in the top of the member 8 of the U-shaped tube, whereupon an instantaneous and accurate corresponding variation of the liquid levels 17 and 18 within said tube will occur, thereby causing the float 15 to rise or fall according to said variations, so that the variation of level of the gasoline in the tank 1 will be instantly indicated upon the scale 21.

It will be understood that while I have designated the liquid 16 in the U-shaped tube as being preferably of vegetable oil which does not freeze or evaporate, other liquids having the same or equivalent physical properties or characteristics may be employed.

While I have designed my novel indicator particularly for use in automobiles or other self-propelled vehicles, since the same is capable of being readily installed thereon, without any change or dismantling of any of the standard automobile units, it will be apparent that the broad principle of my invention is applicable to stationary tanks or for indicating the height or variations of level of other liquids than gasoline, and it will be understood that in its broad adaptation, my invention is applicable as an indicator for indicating the variations in level of any other liquid than gasoline, and is equally capable of adaptation to any tank containing such liquid, for the purpose specified.

It will now be apparent that I have devised a novel and useful gasoline indicator which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention what I claim as new and desire to secure by Letters Patent, is:—

1. In a pressure gauge of the character stated, a U-shaped tube composed of two members of different lengths communicating at their lower portions, the longer of said members being provided with a float, an indicating device connected to said float and located in the upper portion of said longer member, a downward extension for the longer member of said tube, a counterweight contained in said downward extension and connected with the bottom of said float and a pressure conveying tube extended into the shorter member of said U-shaped tube, and having its upper end terminating at the upper portion of said shorter member.

2. In a pressure gauge of the character stated, a U-shaped tube composed of two upright members of different lengths communicating at their lower portions, the longer of said members being provided with a float, an indicating device on the upper end of said float, a transparent tube enclosing the upper end of said indicating device, a rod secured to the bottom of said float, a guide for said rod, a chain attached to the bottom of said rod, and a pressure conveying tube having its upper end terminating at the upper portion of the shorter member of said tube.

THOMAS M. EYNON.